(12) United States Patent
Bichot

(10) Patent No.: US 7,630,333 B2
(45) Date of Patent: Dec. 8, 2009

(54) METHOD AND APPARATUS FOR PAGING A MOBILE TERMINAL IN A WIRELESS LAN

(75) Inventor: Guillaume Bichot, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 763 days.

(21) Appl. No.: 10/497,750

(22) PCT Filed: Dec. 4, 2002

(86) PCT No.: PCT/US02/38610

§ 371 (c)(1),
(2), (4) Date: Jun. 4, 2004

(87) PCT Pub. No.: WO03/051077

PCT Pub. Date: Jun. 19, 2003

(65) Prior Publication Data

US 2005/0002346 A1    Jan. 6, 2005

Related U.S. Application Data

(60) Provisional application No. 60/336,934, filed on Dec. 5, 2001.

(51) Int. Cl.
*H04W 4/00* (2009.01)
(52) U.S. Cl. ...................... 370/328; 455/434
(58) Field of Classification Search ............ None
See application file for complete search history.

(56) References Cited

U.S. PATENT DOCUMENTS 5,276,277 A    1/1994    Hightower et al.
5,496,966 A    3/1996    Hightower et al.
5,790,953 A    8/1998    Wang et al.

(Continued)

FOREIGN PATENT DOCUMENTS

EP    0930798    7/1999

(Continued)

OTHER PUBLICATIONS

Search Report dated Mar. 26, 2003.

(Continued)

*Primary Examiner*—Bob A Phunkulh
(74) *Attorney, Agent, or Firm*—Robert D. Shedd; Joseph J. Opalach; Catherine A. Ferguson

(57) ABSTRACT

An apparatus and a method for implementing a paging mechanism in a wireless LAN, for example, a wireless LAN according to the Hiperlan 2 Technical Specification, for allowing a base station, or an access point, to page a mobile terminal that is not connected with, or associated with, the access point. The present paging mechanism is implemented by transmitting a broadcast channel message that includes an indication that a paging message is included in the current data frame, a second broadcast channel message that includes the information specific to the paging message, and a third broadcast channel message that include information regarding the location of the second broadcast channel message in the data frame. In response to the broadcast channel message indicating the presence of the paging request, the mobile terminal acquires the second and third broadcast channel messages and determines whether the paging request is intended for the mobile terminal.

16 Claims, 3 Drawing Sheets

U.S. PATENT DOCUMENTS

| | | | |
|---|---|---|---|
| 6,115,390 A | | 9/2000 | Chuah |
| 6,137,772 A * | | 10/2000 | Turcotte et al. ............. 370/329 |
| 6,138,034 A * | | 10/2000 | Willey ........................ 455/522 |
| 6,216,004 B1 * | | 4/2001 | Tiedemann et al. .......... 455/442 |
| 6,226,279 B1 * | | 5/2001 | Hansson et al. ............. 370/329 |
| 6,438,375 B1 * | | 8/2002 | Muller ..................... 455/435.3 |
| 6,505,058 B1 * | | 1/2003 | Willey ........................ 455/574 |
| 6,622,251 B1 * | | 9/2003 | Lindskog et al. ............ 713/300 |
| 6,775,259 B1 * | | 8/2004 | Ranta ......................... 370/341 |
| 6,778,521 B1 * | | 8/2004 | Korpela et al. .............. 370/345 |
| 6,816,736 B2 * | | 11/2004 | Laroia et al. ................ 455/458 |
| 6,882,842 B2 * | | 4/2005 | Stephan et al. .............. 455/434 |
| 6,889,067 B2 * | | 5/2005 | Willey ........................ 455/574 |
| 7,020,102 B2 * | | 3/2006 | Tuomainen et al. ......... 370/311 |
| 7,123,628 B1 * | | 10/2006 | Hwang et al. ............... 370/469 |
| 2001/0034233 A1 * | | 10/2001 | Tiedemann et al. ......... 455/436 |
| 2002/0077087 A1 * | | 6/2002 | Li .............................. 455/414 |
| 2002/0119792 A1 * | | 8/2002 | Silvestri .................... 455/463 |

FOREIGN PATENT DOCUMENTS

| | | |
|---|---|---|
| EP | 0732863 | 9/2003 |
| JP | 11298533 A | 10/1999 |
| WO | 2006/61441 A1 | 8/2001 |

OTHER PUBLICATIONS

European Search Report dated Dec. 19, 2006, Application No. EP02789993.9-1249.

Kagami, O. et al. "Development of An Advanced Wireless Access (AWA) System, An Advanced Wireless Access System", NTT R&D, Feb. 2001 Issue, vol. 50, No. 2, pp. 76-85, The Telecommunications Association, Feb. 10, 2001.

* cited by examiner

METHOD AND APPARATUS FOR PAGING A MOBILE TERMINAL IN A WIRELESS LAN

This application claims the benefit, under 35 U.S.C.§365 of International Application PCT/US02/38610, filed Dec. 4, 2002, which was published in accordance with PCT Article 21(2) on Jun. 19, 2003 in English and which claims the benefit of United States Provisional patent application No. 60/336,934, filed Dec. 5, 2001.

The present invention relates to an apparatus and a method for providing paging capability in a wireless LAN that allows a base station, or an access point, to send paging message to a mobile terminal that is not currently associated with, or connected to, the base station.

BACKGROUND OF THE INVENTION

Recently, wireless LAN technologies, such as IEEE 802.11 or ETSI Hiperlan 2, have been developed that may be used in conjunction with existing networks, including mobile networks, i.e., 3G or 2G, to provide various services. The wireless LAN services provide the advantages of faster data speeds, generally on the order of about ten times faster than those provided by a 3G network, but are much more limited in the area of coverage and the number of users that can be connected to the base station. It is envisioned that a mobile terminal user would transition from a mobile telephony network to a wireless LAN upon entering a coverage area of the wireless LAN, and transition to the mobile telephony network upon leaving the coverage area of the wireless LAN. In order to facilitate the interconnection between the services provided by the mobile networks and the wireless LANs, it is desirable that the wireless LANs provide the same services expected from a 3G network.

One such important feature of a mobile network, such as a 3G network, is the ability to page a mobile terminal, that is, the ability for the core network to page the mobile terminal that is not currently connected to the access network. A mobile network is essentially made up of a radio access network and a core network. A mobile terminal has a relationship with the core network through the radio access network. That is a mobile terminal needs to be connected to the radio access network in order to communicate with the core network. During periods when the mobile terminal is not required to be directly communicating with the core network the mobile terminal may enter an IDLE mode to save radio resources and to conserve power. In such a mode, the mobile terminal is not connected with the access network. If the core network needs to communicate with the mobile terminal, then the core network requests that the radio access network page the mobile terminal. The paging mechanism is generally implemented within the radio interface between the mobile terminal and the base station. The paging process comprises initiating a downlink broadcast from the network to the mobile terminal that requests that the mobile terminal connect to the radio access network. The mobile terminal determines the presence of the downlink broadcast, and in response, develops a connection with radio access network to communicate with the core network. In this manner, a mobile terminal does not need to be permanently connected to the radio access network, and thus, consume resources of the access network.

However, such paging capability is not available between a mobile terminal and a base station in current wireless LANs, for example a wireless LAN based on the Hiperlan 2 Technical Specification. In current wireless LAN arrangements, the mobile terminal must be permanently connected to the base station, or "access point," in order for the mobile terminal to detect a downlink message. However, having a mobile terminal permanently connected to the access point requires that resources be provisioned for that mobile terminal. In a Hiperlan 2 network, connection to the access point requires that a MAC ID addressed be reserved for that mobile terminal. However, the number of MAC ID addresses available for a specific access point is generally limited. In a Hiperlan 2 network, the number of addresses is limited to less than 250. Therefore, a problem may arise in the availability of network resources if the total number of mobile terminal that desire to be connected to a particular access point, or receive downlinks through the particular access point, exceeds 250.

Some wireless LAN arrangements, including Hiperlan 2 may allow a mobile terminal to enter a SLEEP mode, wherein the mobile terminal goes to a low power mode without losing data. In such a mode, the mobile terminal wakes up at specific intervals negotiated with the access point to check whether any pending messages have been buffered for the mobile terminal. If there is a pending message, the mobile terminal leaves the SLEEP mode and enters an ACTIVE mode to receive and process the pending message. However, the SLEEP mode is not suitable for implementing a paging mechanism between the base station and the mobile terminal because the mobile terminal must still connect to the base station when checking for buffered messages. The mobile terminal is still seen by the access point as a connected device, even while the mobile terminal is in the SLEEP mode. Therefore, a MAC ID must be allocated and some resources must be provisioned for that mobile terminal. This means that the total number of mobile terminals that can be connected, or periodically receive downlink messages remains the same.

Another potential method of implementing a paging mechanism between an access point and a mobile terminal might be for the mobile terminal to actually disconnect from the access point and periodically connect to the access point in order to check with the corresponding convergence layer to determine whether downlink messages are pending. However, this requires the mobile terminal to initiate the association procedure each time it connects with the access point, which is power consuming. Furthermore, if all mobile terminals need to be periodically associated just for paging polling purposes, the procedure is radio resource and MAC ID consuming, whereas only one device may be affected by the paging.

Therefore, there is a need for an apparatus and a method for implementing a paging mechanism between an access point and a mobile terminal in a wireless LAN that does not require the mobile terminals to be permanently connected to, or to periodically associate with, an access point.

BRIEF SUMMARY OF THE INVENTION

In accordance with the principles of the present invention, there is provided an apparatus and a method for implementing a paging mechanism between an access point and a mobile terminal that is not associated with, or connected to, the access point.

According to the present invention, a paging request is transmitted by an access point using a combination of a broadcast channel that is transmitted with every radio, or data, frame and indicates the presence of a paging request, and a second broadcast channel that includes the actual data associated with the paging request. The broadcast channel information, or message, and the second broadcast channel information, or message, can be received by the mobile terminal while disassociated from the access point. The second broadcast channel information includes, for example, the source identity format, the target identity format, the source identity, and the target identity. The second broadcast channel information may be in the form of a transport broadcast control message that is transmitted as necessary. A third broadcast channel, which provides information regarding the location of the second broadcast channel within the data frame, may be included in the radio frame.

According to the present invention, a mobile terminal that is disassociated from the access point is configured to check, periodically if desired, the broadcast channel to determine the presence of a paging request. If the presence of a paging request is indicated, the mobile terminal checks the second broadcast channel to determine whether the paging request is intended for the mobile terminal. If so, the mobile terminal goes into a wake-up mode and associates with the access point to communicate with the core network. In another embodiment, the mobile terminal checks the third broadcast channel in response to an indication of a paging request, to receive the second broadcast channel.

In an exemplary embodiment, the paging mechanism is implemented in a wireless LAN that complies with the Hiperlan 2 Technical Specification. Specifically, the indication of a paging request is transmitted in a flag within a BCCH message, and the RBCH carries the data specific to the paging request. The FCCH message in the data frame provides the location of the associated RBCH message within the data frame. The associated RBCH is carried in a LCH and includes various information, including the source identity extension format, the target identity format, the source identity extension, and the target identity.

BRIEF DESCRIPTION OF THE DRAWINGS

The invention is described with reference to the figures, wherein.

DETAILED DESCRIPTION

The present invention provides an apparatus and a method for implementing a paging feature in an access network such as a wireless LAN, and in particular, a wireless LAN according to ETSI/BRAN/HIPERLAN2 specifications. The paging procedure provides a method for a mobile terminal, after a first connection, to be disconnected from the access network and still be attached to the network via an upper layer entity. The upper layer entity can then request, through a paging message, that the mobile terminal initiate a connection through the access network as necessary.

Figure 1:
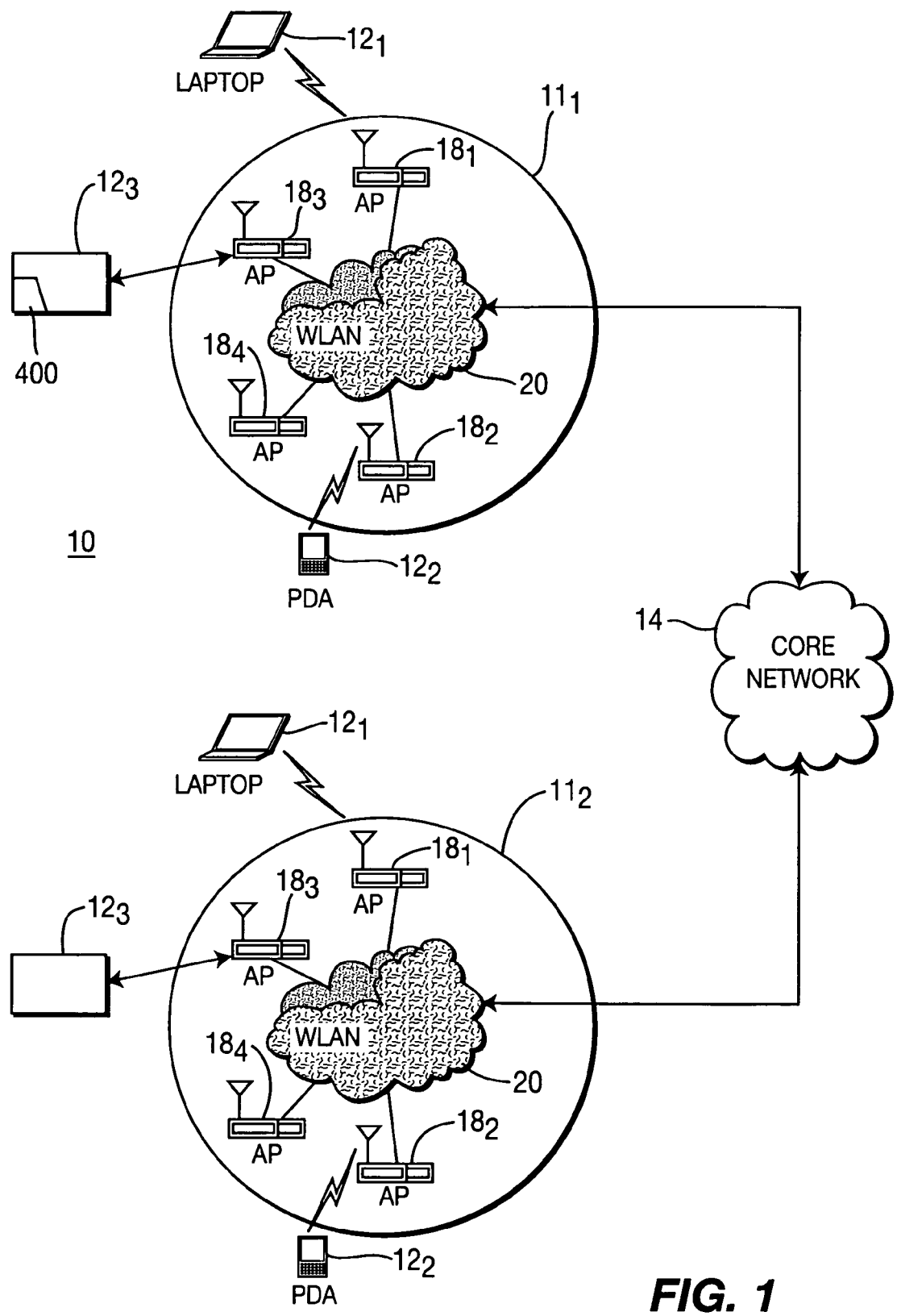
FIG. 1 illustrates a block schematic diagram of a communications system that includes a plurality of wireless LANs for practicing the paging technique of the present invention.

FIG. 1 depicts a block schematic diagram of a communications system 10 that includes at least one, and preferably, a plurality of radio access networks, illustratively depicted by radio access networks $11_1$ and $11_2$. The radio access networks $11_1$ and $11_2$ each enable at least one mobile terminal user, and preferably a plurality of users (e.g., users $12_1$, $12_2$, and $12_3$) to access an external data network 14 such as the Internet or the like. In a preferred embodiment, each user $12_1$ utilizes a laptop computer to access a corresponding one of the networks $11_1$ and $11_2$ while each user $12_2$ utilizes a Personal Data Assistant and each user $12_3$ utilizes a wireless communications appliance such as wireless telephone. Other users can utilize other types of communications appliances.

Each of the radio access networks $11_1$ and $11_2$ includes at least one, and preferably, a plurality of access points (APs), illustratively illustrated by APs $18_1$-$18_4$, via which each of the mobile terminal users $12_1$, $12_2$ and $12_3$ accesses a wireless LAN 20 within each access network. In the illustrated embodiment, each AP, such as AP $18_1$, includes a wireless transceiver (not shown) for exchanging radio frequency signals with a radio transceiver (not shown) within the communications appliance employed by each user. Each of the APs $18_1$-$18_4$ in each of the radio access networks $11_1$ and $11_2$ employs at least one well-known wireless data exchange protocol such as the Hiperlan 2 radio interface standard.

After completing a data communications session with the wireless LAN 20 within a radio access network, such as radio access network $11_1$, a mobile user, such as user $12_3$ can choose to enter a SLEEP mode to reduce the consumption of internal (i.e., battery) resources while still retaining a connection with its associated AP (i.e., AP $18_3$). Despite being in the SLEEP mode, the mobile terminal user $12_3$ remains associated with the AP $18_3$ in the radio access network and consumes an address and other resources to remain known to the network.

In accordance with the present principles, a mobile terminal user, such as user $18_3$, upon completing a data communications session, can enter an idle mode whereby the user reduces its internal (battery) resources and disassociates itself from its corresponding AP, (i.e., AP $18_3$). In this way, the mobile terminal user $18_3$, upon entering an idle mode, no longer consumes an address within the AP $18_3$, thus precluding the ability of the AP to track the user. Upon receiving traffic destined for the mobile terminal $18_3$ currently in an idle mode, the AP $18_3$ must in some way initiate a reconnection.

In accordance with the present principles, there is provided a technique for implementing a paging capability in a radio access network, such as the radio access networks $11_1$ and $11_2$, which may utilize the Hiperlan 2 radio interface standard, to signal a disassociated mobile user to initiate a connection with the network. For example, the mobile terminal user can lack an association with the radio access network because the user has entered the above-described idle mode. Indeed, the mobile terminal user can lack an association with the radio access network because the user has never had any connection at all with the network.

Figure 2:
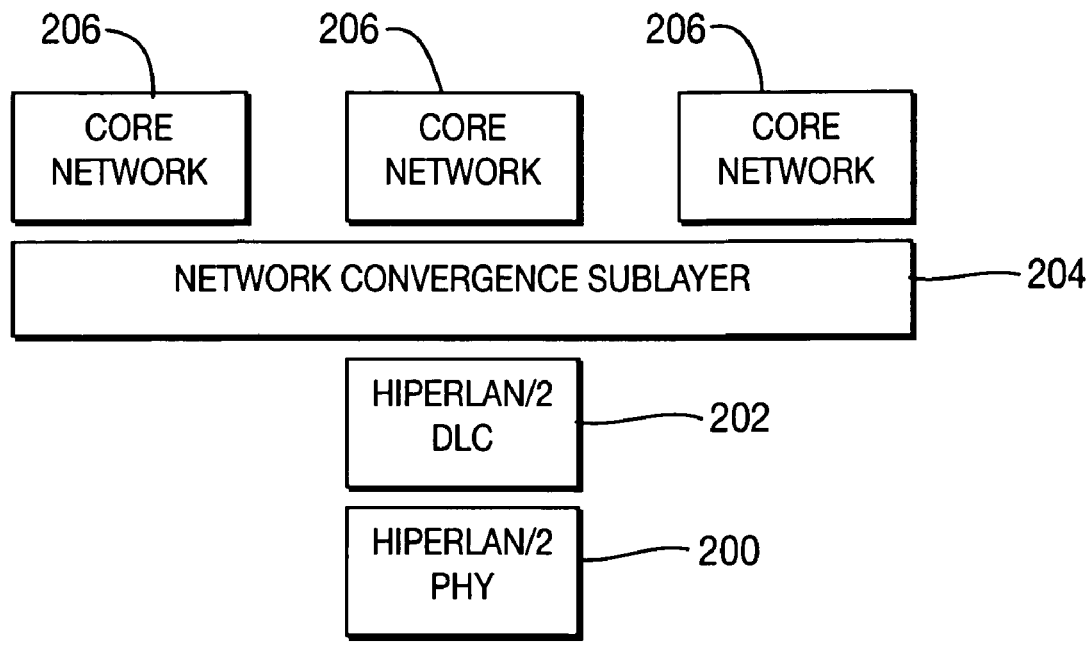
FIG. 2 illustrates the terminal stack according to the Hiperlan 2 Technical Specification.

The network stack in a Hiperlan 2 environment is illustrated in FIG. 2, wherein the Hiperlan 2 Technical Specifications describe the PHY and Data Link Control ("DLC") layers 200 and 202 and the core network specific convergence layer 204. The convergence layer 204 offers service to and interfaces with the higher layers. The convergence layer is an adaptation layer between the network layer and the link layer. A convergence layer entity within the access point may broadcast data to the peer entity with the mobile terminal. Several convergence layers may co-exist with the mobile terminal and the access point. The PHY layer 200 provides the basic data transport functions. The DLC layer 202 provides for the error control (EC) function, the medium access control (MAC) function and the radio link control (RLC) function.

Hiperlan 2 sets forth various logical channels managed by the DLC layer 202. The following are broadcast channels that transport general information and can be used to carry a specific paging message in accordance with the invention:

BCCH (Broadcast Channel): this channel conveys general information about the whole cell, which comprises the radio space covered by an access point);

RBCH (Radio Broadcast Channel): this channel is used to transport broadcast control messages generated by the RLC layer. The RLC is a sub-layer within the DLC that transports messages relative to the attachment of the mobile terminal with the access point; and UBCH (User Broadcast Channel): this channel is used to broadcast data from the convergence layer, which is the entity located above the DLC layer.

Figure 3:
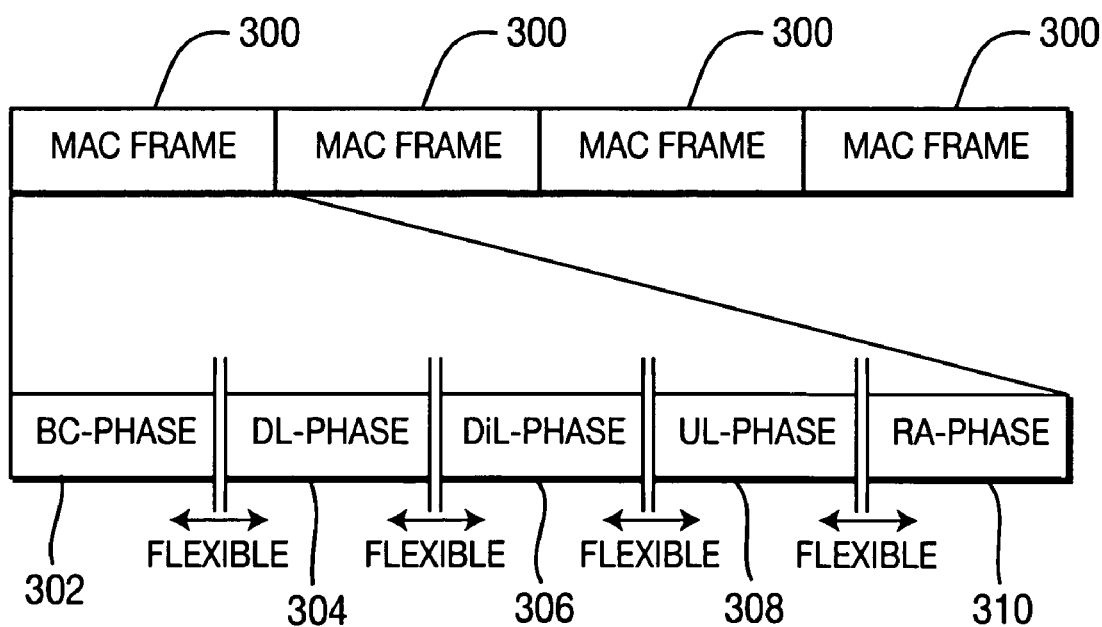
FIG. 3 illustrates the basic MAC frame according to the Hiperlan 2 Technical Specification.

The format of a MAC frame according to Hiperlan 2 is shown in FIG. 3. Each MAC frame 300 has a duration of 2 ms and consists of a sequence of phases. The BCCH channel is transmitted in each frame 300 during the BC-phase 302. The RBCH is transmitted only when necessary during DL-phase 304. The SLEEP mode is implemented using the BCCH. A mobile terminal wakes up regularly in order to check the BCCH according to a period negotiated with the access point. If the access point has a pending message for a particular mobile terminal, a dedicated flag is set in the BCCH. The mobile terminal is required to check the FCCH (Frame control Channel) channel that contains indication about pending downlink data. The FCCH channel includes information regarding the remaining portions of the MAC frame and is transmitted during BC-phase 302.

Although the BCCH may be used to trigger a wake up procedure in the mobile terminal, it is not desirable to use the BCCH in implementing a paging mechanism. The size of the BCCH packet is fixed and very limited in size. Further, the use of the BCCH to implement a paging mechanism may preclude its use in the SLEEP mode and prevent backward compatibility.

Figure 4:
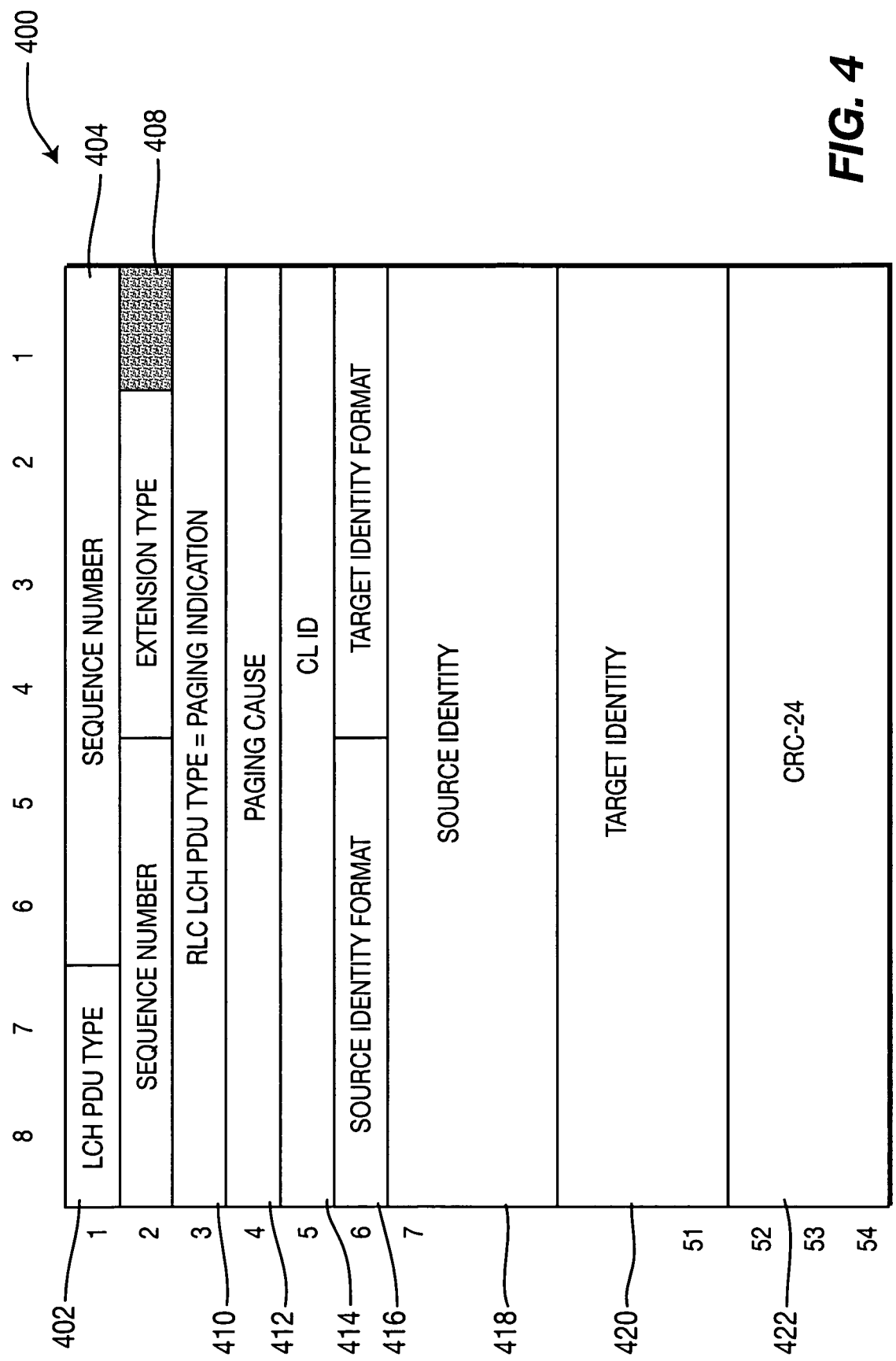
FIG. 4 illustrates the format of a RBCH message adapted for implementing a paging mechanism according to the present invention.

In accordance with the principles of the present invention, a paging indication is carried within a RBCH associated with the BCCH message. The RBCH is a logical channel that is mapped by the DLC over a transport channel. Two transport channels, namely the Long Channel (LCH) and Short Channel (SCH) may be used to carry the RBCH. The LCH is 54 bytes long and the SCH is 9 bytes. In the present invention, the LCH is utilized to carry the paging message due to the larger size. The paging message may be implemented using the SCH, but due to the limited size, the paging message may need to be reduced or transmitted over several message cycles. The format of a LCH for implementing the paging mechanism is illustrated in FIG. 4.

LCH paging indication 400 carries the following information. Target identity field 420 includes the identification of the mobile terminal being paged. Since the paging mechanism is used when the mobile terminal is not connected to the access point, the identity of the device is an identity managed by an upper layer (convergence layer). The identity may be any suitable, unique identifier associated with the mobile terminal, including, but not limited to, device identification number, subscriber number, and URL. The format of the identity is known at this level. The interpretation of this field depends on the source identity. Source identity field 418 provides the identity of the entity that has triggered the paging procedure.

LCH PDU type field 402, Sequence number field 404, Extension type field 408, RLC LCH PDU type field 410 and CRC field 422 represent the LCH header, the RBCH logical channel header and the RLC header.

Extension type field 408 indicates whether the RLC message is part of the basic RLC protocol or part of some extensions already defined for the home and the business environments. This proposal may be incorporated within the basic RLC as well as any extension. A potential new extension could be public network since one application that will use the paging mechanism is Hiperlan 2 as an access network for a mobile network. RLC LCH PDU type field 410 includes an available number reserved for the RLC ACF (Association Control Function). The list of numbers is available in the Hiperlan 2 Technical Specification.

The source identity format field 416 and target identity format field 417 include information that depends on the convergence layer (source identity CL ID field 414). These fields may indicate a number of bytes (from 0 to 48) or a way the corresponding address is formatted. The source identity field 418 and the target identity field 420 are coded according to the format specified in the source identity format field 416 and the target identity format field 417.

The steps for implementing the paging procedure is now described. The mobile terminal may be paged even though it has never been associated with the corresponding access point. The mobile terminal wakes up periodically and checks the BCCH to detect whether RBCH information is present. If a paging request is to be broadcasted, the access point generates the paging request and consecutively repeats the request according to a proprietary period. If an association is performed between the mobile terminal and the access point the following applies. During the association procedure, the mobile terminal may exchange with the access point various information about the capabilities of the mobile terminal. The association phase may also be used to negotiate a paging group between the mobile terminal and the access point. The paging group corresponds to a sleeping group defined in the Hiperlan 2 Technical Specification. The use of a sleeping group allows the mobile terminal and the access point to define the cycles between which the mobile terminal checks the BCCH, in other words the periodicity for checking the BCCH by the mobile terminal. Once the sleeping group is defined, the mobile terminal is then only required to check the BCCH message at predetermined intervals rather than checking every BBCH message, thereby reducing power consumption in the mobile terminal. The paging mechanism according to the terminal may optionally utilize the paging group technique to advantageously reduce power consumption by the mobile terminal. Upon completion of the association procedure, the mobile terminal may be disconnected, either explicitly or implicitly, from the access point and begin checking the BCCH messages according to the negotiated paging period.

When a request to page the mobile terminal is received by the convergence layer, the convergence layer delivers a set of required information to the DLC using a page request. In this regard, the access point generates and transmits a BCCH message with a flag indicating the presence of the RBCH having the appropriate paging information. The access point also generates and transmits in the data frame a RBCH message having the necessary paging information. The necessary information includes: paging cause, source identity CL ID, source identity format, target identity format, source identity, and the target identity. The access point then transmits the paging indication, according to the paging groups if set, until the mobile terminal attempts to connect to the access point. The number of cycles attempted before stopping the paging procedure is a configuration parameter of the access point.

In response to the flag in the BCCH, the mobile terminal checks the FCCH message to determine the transport channel location (time slot) of the RBCH. The mobile terminal then acquires and decodes the RLC LCH PDU type field 410 to determine whether a paging indication is present. If a paging indication is present, the mobile terminal then checks the remaining fields as follows: the source identity CL ID field 414 is checked to determine whether the paging indication came from a convergence layer supported by the mobile terminal, if so, target identity 420 is checked to determine whether the paging message is intended for that mobile terminal, if so, the source identity field 418 is checked to determine the paging source, and then the mobile terminal initiates an association procedure to establish, or reestablish a connection with the access point.

After the mobile terminal associates with the access point in response to the paging indication, the convergence layer in the access point sends a paging stop message to the DLC layer requesting the DLC to stop broadcasting the associated paging request message. If there is no response from a mobile terminal after a predetermined period of time, the DLC may send a paging response message to the convergence layer indicating the failure of the paging attempt.

In the case of a handover, the mobile terminal changes the attachment point from one access point to another. In that case, the mobile terminal may initiate an association procedure with the new access point in order to renegotiate the paging period. Thereafter, the paging mechanism may be utilized between the mobile terminal and the new access point.

The foregoing describes an apparatus and a method for implementing a paging technique for a mobile terminal that is not currently associated with, or connected to, an access point in a wireless LAN. Since the mobile terminal is not required to be permanently connected to the access point, the mobile terminal does not consume access point resources, such as the MAC ID, and thus, potentially allows a larger number of devices to be connected to the access point than otherwise would be possible.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

I claim:

1. A method for paging a mobile terminal that is disassociated from an access point in a wireless LAN, comprising the steps of:
   receiving a paging request in a link control layer from a convergence layer;
   generating in the link control layer a first broadcast channel message including data indicative of the presence of the paging request;
   generating in the link control layer a second broadcast channel message having data representative of the paging request;
   transmitting the first broadcast channel message and the second broadcast channel message over a broadcast channel; and
   generating in the link control layer a third broadcast channel message having data associated with the structure of the data frame and information regarding the second broadcast channel message, wherein
   the transmitting step comprises transmitting the first broadcast channel message, the second broadcast channel message, and the third broadcast channel message in the data frame.

2. The method according to claim 1, wherein the third broadcast channel message includes data indicative of the position of the second broadcast channel message in the data frame.

3. The method according to claim 1, wherein the wireless LAN comprises a wireless LAN that complies with the Hiperlan 2 Technical Specification, the first broadcast channel message corresponds to a BCCH message, the second broadcast channel message corresponds to a RBCH message, and the third broadcast channel message corresponds to a FCCH message.

4. The method according to claim 3, wherein the RBCH is carried in a LCH.

5. The method according to claim 4, wherein the RBCH includes a target identity format field, a target identity field, a source identity extension format field, and a source identity extension field.

6. The method according to claim 1 further comprising the steps of:
   negotiating, with the mobile terminal, a periodic interval for checking the first broadcast channel message; and
   transmitting the first broadcast channel message and the second broadcast channel message only during the intervals that correspond with the negotiated periodic intervals.

7. The method according to claim 6, wherein the negotiated periodic interval is associated with a selected one of a plurality of paging groups.

8. The method according to claim 7, wherein the second broadcast channel message includes a target identity format field, a source identity extension format field, and a source identity extension field.

9. A network access point for transmitting a paging request to a mobile terminal that is not currently associated with the network access point, comprising:
   receiving means coupled to a core network for receiving a paging request in a link control layer;
   the link control layer for generating a first broadcast channel message having data indicative of the presence of the paging request and for generating a second broadcast channel message having data representative of the paging request;
   receiving means coupled to the link control layer for transmitting the first broadcast channel message and the second broadcast channel message over a broadcast channel
   wherein the link control layer generates a third broadcast channel message having data indicative of the location of the second broadcast channel message within a data frame, and the transmitting means transmits the first broadcast channel message, the second broadcast channel message and the third broadcast channel message in the data frame.

10. The network access point according to claim 9, wherein the transmitting means transmits the data frame in accordance with Hiperlan 2, the first broadcast channel message corresponds to a BCCH message, the second broadcast channel message corresponds to a RBCH message, and the third broadcast channel message corresponds to a FCCH message.

11. The network access point according to claim 10, wherein the transmitting means transmits the RBCH in a LCH.

12. The network access point according to claim 9, wherein the transmitting means transmits the paging request during predetermined intervals defined by a paging group of a target device.

13. A method for controlling a mobile terminal device that is currently disassociated with an access point in a wireless LAN, comprising the steps of:

checking a broadcast channel, for a first broadcast channel message transmitted by the access point, for data indicative of a paging request;

detecting, in response to data indicative of the first broadcast channel message, a second broadcast channel message and determining whether the first broadcast channel message includes a paging request;

determining whether the paging request is intended for the mobile terminal device; and initiating an association procedure to establish a connection with the access point and transmitting a response to the paging request, in response to the determination that the paging request is intended for the mobile terminal device, wherein the second broadcast channel message is transmitted over the broadcast channel.

14. The method according to claim 13, further comprising the steps of:

detecting a third broadcast channel message having data indicative of the location of the second broadcast channel message in the data frame, and acquiring the second broadcast channel message in response to the third broadcast channel message.

15. The method according to claim 14, wherein the mobile terminal operates in accordance with Hiperlan 2 Technical Specification, and the checking step comprises checking a BCCH message, and the detecting steps comprise detecting a RBCH message and a FCCH message.

16. The method according to claim 13, further comprising the step of: associating with the access point to negotiate a paging group, the paging group being associated with a predetermined period interval for receiving paging requests, and thereafter disassociating from the access point and checking the broadcast channel message only during the time intervals associated with the paging group.

* * * * *

UNITED STATES PATENT AND TRADEMARK OFFICE
CERTIFICATE OF CORRECTION

PATENT NO. : 7,630,333 B2  Page 1 of 1
APPLICATION NO. : 10/497750
DATED : December 8, 2009
INVENTOR(S) : Guillaume Bichot It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1230 days.

Signed and Sealed this

Second Day of November, 2010

David J. Kappos
*Director of the United States Patent and Trademark Office*